US009494645B2

United States Patent
Guilley et al.

(10) Patent No.: US 9,494,645 B2
(45) Date of Patent: Nov. 15, 2016

(54) METHOD FOR TESTING CRYPTOGRAPHIC CIRCUITS, SECURED CRYPTOGRAPHIC CIRCUIT CAPABLE OF BEING TESTED, AND METHOD FOR WIRING SUCH CIRCUIT

(75) Inventors: Sylvain Guilley, Paris (FR); Jean-Luc Danger, Antony (FR)

(73) Assignee: INSTITUT TELECOM-TELECOM PARIS TECH, Paris (FR)

( * ) Notice: Subject to any disclaimer, the term of this patent is extended or adjusted under 35 U.S.C. 154(b) by 552 days.

(21) Appl. No.: 12/919,016

(22) PCT Filed: Feb. 11, 2009

(86) PCT No.: PCT/EP2009/051600
§ 371 (c)(1),
(2), (4) Date: May 2, 2011

(87) PCT Pub. No.: WO2009/106428
PCT Pub. Date: Sep. 3, 2009

(65) Prior Publication Data
US 2011/0261953 A1 Oct. 27, 2011

(30) Foreign Application Priority Data
Feb. 25, 2008 (FR) ...................................... 08 51184

(51) Int. Cl.
*G06F 21/00* (2013.01)
*G01R 31/317* (2006.01)
(Continued)

(52) U.S. Cl.
CPC ....... *G01R 31/31719* (2013.01); *G06F 21/558* (2013.01); *G06F 21/75* (2013.01);
(Continued)

(58) Field of Classification Search
CPC . H04L 9/0625; H04L 9/003; H04L 2209/26; H04L 9/00; H04L 9/002; H04L 2209/127; G06F 21/558; G06F 21/75; G01R 31/31719
See application file for complete search history.

(56) References Cited

U.S. PATENT DOCUMENTS 5,349,248 A * 9/1994 Parlour ............ H03K 19/17704
326/38
5,554,928 A * 9/1996 Stringer ............. G01R 31/2834
324/523

(Continued)

FOREIGN PATENT DOCUMENTS

WO   WO2009106428 A1   9/2009

OTHER PUBLICATIONS

Pengyuan Yu, Implementation of DPA-Resistant Circuit for FPGA, Apr. 24 2007,thesis submitted to the faculty of the Virginia Polytechnic Institute and State University in Partial fulfillment of the requirements for the degree of Master of Science in Computer Engineering.*
Paul Kocher et al., "Differential Power Analysis: Leaking Secrets," Proceedings of CRYPTO'99, vol. 1666 of LNCS, pp. 388-397, Springer-Verlag, San Francisco, California.
Sylvain Guilley et al., "Improving Side-Channel Attacks by Exploiting Substitution Boxes Properties," BFCA—http://www.liafa.jussieu.frbfca/, pp. 1-25, May 2-4, 2007, Paris, France.
(Continued)

*Primary Examiner* — William Goodchild
(74) *Attorney, Agent, or Firm* — Baker & Hostetler LLP

(57) ABSTRACT

The present invention relates to a method for testing cryptography circuits. It also relates to a secure cryptography circuit capable of being tested. The cryptography circuit includes registers and logic gates, and a test thereof performs a differential power analysis on the registers of the circuit. A cryptography circuit being secure and including a first half-circuit associated with a second half-circuit operating in complementary logic, the electric power supply of the first half-circuit is separated from the electric power supply of the second half-circuit, the differential power analysis being carried out in parallel on each half-circuit, the two power supplies being combined into one and the same electric power supply after the test.

15 Claims, 3 Drawing Sheets

(51) Int. Cl.
  *G06F 21/55* (2013.01)
  *G06F 21/75* (2013.01)
  *H04L 9/00* (2006.01)
  *H04L 9/06* (2006.01)

(52) U.S. Cl.
  CPC ............ *H04L 9/003* (2013.01); *H04L 9/0625* (2013.01); *H04L 2209/125* (2013.01); *H04L 2209/127* (2013.01); *H04L 2209/26* (2013.01)

(56) References Cited

U.S. PATENT DOCUMENTS

| | | | | |
|---|---|---|---|---|
| 5,917,250 | A * | 6/1999 | Kakalec | H02J 1/10 307/113 |
| 6,043,672 | A * | 3/2000 | Sugasawara | G01R 31/2839 324/750.3 |
| 6,560,737 | B1 | 5/2003 | Colon-Bonet et al. | |
| 7,205,681 | B2 * | 4/2007 | Nguyen | H02J 1/10 307/18 |
| 7,814,347 | B2 * | 10/2010 | Wakamatsu | G06F 11/2015 307/18 |
| 7,924,057 | B2 * | 4/2011 | Verbauwhede et al. | 326/93 |
| 8,120,141 | B2 * | 2/2012 | Gambino | H01L 23/5256 257/529 |
| 2004/0025032 | A1 * | 2/2004 | Chow | G06K 19/07363 713/189 |
| 2004/0232937 | A1 * | 11/2004 | Ishibashi | G11C 29/02 324/750.3 |
| 2005/0213757 | A1 | 9/2005 | Kunemund | |
| 2005/0241005 | A1 * | 10/2005 | Kunemund | G06F 21/75 726/36 |
| 2006/0200514 | A1 * | 9/2006 | Fischer | G06F 7/38 708/446 |
| 2007/0188355 | A1 * | 8/2007 | Baek | 341/51 |
| 2008/0022146 | A1 * | 1/2008 | Kocher | G06F 7/00 713/600 |
| 2008/0049940 | A1 * | 2/2008 | Kocher | G06Q 20/341 380/277 |
| 2010/0166177 | A1 * | 7/2010 | Sirio et al. | 380/30 |
| 2011/0261953 | A1 | 10/2011 | Guilley et al. | |

OTHER PUBLICATIONS

Gilles Piret, "A Note on the Plaintexts Choice in Power Analysis Attacks," Technical Report from the Ecole Normale Supérieure (ENS), France, Nov. 2005.

Pengyuan Yu: "Implementation of 1-13 OPA-Resistant Circuit for FPGA" [Online], Apr. 24, 2007, Blacksburg, Virginia, USA, XP002500223, Retrieved from the Internet: URL:http://scholar.lib.vt.edu/theses/available/etd-04302007-134556/unrestricted/Thesis.pdf> [retrieved on Oct. 16, 2008], pp. 1-51.

Kris Tiri, et al.: "Prototype IC with WDDL and Differential Routing—DPA Resistance Assessment," Cryptographic Hardware and Embedded Systems—CHES 2005 Lecture Notes in Computer Science;;LNCS, Springer, Berlin, DE, vol. 3659, Jan. 1, 2005, pp. 354-365, XP019017443, ISBN: 978-3-540-28474-1.

\* cited by examiner

METHOD FOR TESTING CRYPTOGRAPHIC CIRCUITS, SECURED CRYPTOGRAPHIC CIRCUIT CAPABLE OF BEING TESTED, AND METHOD FOR WIRING SUCH CIRCUIT

CROSS-REFERENCE TO RELATED APPLICATIONS

This application is a National Stage of International patent application PCT/EP2009/051600, filed on Feb. 11, 2009, which claims priority to foreign French patent application No. FR 08 51184, filed on Feb. 25, 2008, the disclosures of which are incorporated by reference in their entirety.

FIELD OF THE INVENTION

The present invention relates to a method for testing cryptography circuits. It also relates to a secure cryptography circuit capable of being tested.

BACKGROUND OF THE INVENTION

Cryptography circuits, like most electronic circuits, must undergo tests before they are used. Cryptography circuit tests therefore form part of the general issues of the test of electronic circuits, but with certain particular features.

The tests are used to check after fabrication that the circuits correctly fulfill their intended functions. Specifically, a circuit may comprise several fabrication defects originating notably:

from a lack of homogeneity of the chemical substances used, causing a deterioration in performance;
from the deposition of an impurity such as a dust for example causing a local destruction of the circuit;
from the omission of a fabrication step causing the malfunction of the circuit;
from a confusion in the use of the fabrication masks.

Amongst these defects, the most unforeseeable problems originate from the deposition of a dust which can cause:

a short circuit, that is to say the unintended connection of two equipotentials or "nodes";
or a disconnection, that is to say the disconnection of a node, giving rise to two equipotentials.

In a test phase after fabrication, a circuit is powered in voltage and some of its inputs, very specific inputs, receive test signals. In response to these test signals, a test device can carry out operating checks. For the circuit to be testable, it must fulfill two conditions:

the circuit must be controllable, that is to say that it is possible to bring the circuit to a known state;
it must be observable, that is to say that it is possible to compare a characteristic of the circuit in its known state with a theoretical reference characteristic obtained for example by simulation.

The implementation of these two conditions allows the test device to form a set of test vectors which are as many different checks to be run on the circuit.

A first key parameter of a test is its coverage. The coverage expresses the proportion of logic nodes that are effectively checked. In order to ensure that a circuit is operational, a coverage approaching 100% is desired, but very rarely achieved in practice.

A second key parameter of the test is its cost, which depends notably on two factors:

the number of test vectors, this quantity having to be reduced to the minimum because it is a condition of the duration of interaction with the circuit, the cost being proportional to this duration, in particular, it is important that the rate of the test is higher than the circuit fabrication flow rate, otherwise the factor limiting the production becomes the test itself. It is notably one of the reasons for which the coverage is never 100%;

the insertion of the test equipment, since it is rare that the circuits can be tested in their current state, depending on whether it is agreed to call functional tests, additional equipment often has to be added in order to allow the controllability or observability of the circuits to be tested, this equipment having a cost which reduces the attractiveness of a hardware solution as opposed to a software solution.

Several test techniques are known. For the functional test, no equipment is added. The user simply checks that the outputs of the circuit to be tested are fully in line with a well-determined sequence of the inputs of this same circuit. This test method unfortunately has a poor coverage while requiring a very large number of input vectors. It is therefore practically inapplicable.

In the case of chain tests, the circuit is modified so as to be able to fulfill two roles, on the one hand its functionality and on the other hand the production of an offset register linking all the sequential elements of the circuit, typically the D or DFF flip-flops. The added cost is therefore linked to the number of flip-flops of the circuit, the latter requiring two inputs, a first input called "test in" and a second input called "test enable", which increases the surface area of a circuit. In addition, a functional routing is also added to the routing between flip-flops, reducing the routing possibilities, a critical property in a circuit constrained by interconnection. Finally, it should be noted that the chain test makes it possible to test the nodes bonded to one and the same logic value. This error template is not strictly equal to the true errors that are the short circuits and the disconnections.

In the analog test method called IDDQ, the circuit to be tested is placed in a state and then, with the aid of an ammeter, the current consumed by the circuit is studied. This method makes it possible notably to detect the short circuits as a function of the value of the current consumed. It does not require equipment necessary for observability. However, the IDDQ method is slow. It is also partial because it allows the detection of short circuits only.

In the method called BIST for "built-in self test", a module outside the portion to be tested is added. Notably its role is to take control of the circuit to be tested and to run its test in a dynamic manner. This method applies to simple units, with trivial functionality such as a memory for example, where the user reads exactly what has been written. It is not appropriate for a complex circuit of the cryptography type.

In addition to their complexity, cryptography circuits have antinomic constraints with respect to their test. Specifically, on the one hand, a single error in the functionality can compromise the integrity of the secrets, hence the need for a comprehensive test, but, on the other hand, the addition of test equipment allowing internal observability, destroys the security of the circuit. In particular, a single bit of an intermediate variable of a cryptography algorithm that can be accessed by a hacker can allow the latter to work his way up to the secrets via a cryptographic analysis. Therefore, it is necessary to test the secure circuits, but no existing test method is satisfactory. The functional test does not allow sufficient coverage while 100% coverage is crucial for a cryptography circuit. The test by chaining DFF flip-flops reveals a vulnerability because a hacker can manage, moreover in a logical manner, to read the state of the encryption processor, more precisely its keys or its intermediate values. In order to counter this type of hacking, one solution proposes to make the chaining structure random. Nevertheless, this approach violates the Kerckhoff principle which imposes the concentration of the security in the keys of reduced size and not in the complexity and the confidentiality of the implementation. The IDDQ test, for its part, is too costly and fragmented, while the BIST test is not suitable for a cryptographic computation.

SUMMARY OF THE INVENTION

One object of the invention is notably to allow the testing of cryptography circuits while overcoming the antinomic constraints mentioned above, and more generally the drawbacks of the prior methods. Accordingly, the subject of the invention is a method for testing a cryptography circuit comprising registers and logic gates interconnected by a set of nodes, said method performing a differential power analysis (DPA) comprising:
- a phase of acquiring measurements of power-consumption traces at the nodes as a function of test signal vectors at the input of the circuit;
- a phase of analyzing the rate of activity of the nodes based on the measurements of the power-consumption traces, a node being considered to be operating correctly when its activity rate complies with a prediction template for predicting its activity.

If the cryptography circuit is not secure, the differential analysis by DPA is carried out by way of a test, as if the requirement was to carry out hacking in order to find the cryptographic secret. Therefore the conformity of the activity of each node to an activity predictor makes it possible to establish its integrity. However, the DPA is still long because the predictor depends on the cryptographic secret, which is unknown, and a large number of power-consumption traces are required (of the order of several thousand). If the cryptographic circuit has a mechanism for customizing the secret, it is then possible to inject a "known" cryptographic secret so that the test by DPA is shorter because fewer power-consumption traces are necessary. The secret will be customized in this case after the test in order to ensure the cryptographic protection.

If the cryptography circuit is secured by a differential logic structured around a first half-circuit associated with a second half-circuit in complementary logic, the overall activity of the circuit is balanced and the differential power analysis cannot work. According to the invention, the electric power supply Vdd1 of the first half-circuit is separated from the electric power supply Vdd2 of the second half-circuit, the differential power analysis becoming possible by measuring the activity on each half-circuit. The analysis is carried out in parallel on each half-circuit, two power supplies being combined into one and the same electric power supply after the test.

The components of the first half-circuit are, for example, connected via power supply lines to a first voltage source Vdd1 and the components of the second half-circuit are powered via power supply lines to a second voltage source Vdd2, the two voltage sources being distinct, the power supply lines being connected after the test.

In another embodiment, the components of the first half-circuit are, for example, connected via ground lines to a first reference potential Gnd1 and the components of the second half-circuit are powered via ground lines to a second reference potential Gnd2, the two reference potentials being separated, the ground lines being connected after the test.

Advantageously, the power supplies Vdd1, Vdd2 can be combined at the end of the acquisition phase.

The test by differential analysis can be limited to the nodes of the registers of the circuit which make it possible to deduce therefrom the integrity of the nodes of the logic gates between these registers.

A method of wiring the power supply is associated with the test method described above for the secure logic. The first half-circuit has a first electric power supply path and a second electric power supply path is assigned to the second half-circuit so that each half-circuit can be tested by a differential power analysis (DPA) in parallel with the other half-circuit, the two power supply paths being capable of being short-circuited.

In a particular exemplary embodiment:
- the first power supply path comprises a first peripheral conducting ring capable of being connected to a first voltage source Vdd1 and electrically connected to power supply lines of the components of the first half-circuit and;
- the second power supply path comprises a second peripheral conducting ring capable of being connected to a second voltage source Vdd2 and electrically connected to power supply lines of the components of the second half-circuit; the two rings being capable of being short-circuited.

In another exemplary embodiment:
- the first power supply path comprises a first peripheral conducting ring capable of being connected to a first ground potential Gnd1 and electrically connected to ground lines of the components of the first half-circuit and;
- the second power supply path comprises a second peripheral conducting ring capable of being connected to a second ground potential Gnd2 and electrically connected to ground lines of the components of the second half-circuit; the two rings being capable of being short-circuited.

In these two embodiments, the two rings are, for example, connected together by antifuses, the short-circuit between the two rings being produced by the melting of the antifuses.

The two rings can also be short-circuited in the casing of the circuit.

A further subject of the invention is a method of wiring the power supplies of a secure cryptography circuit comprising a first half-circuit associated with a second half-circuit operating in complementary logic, a first electric power supply path being assigned to the first half-circuit and a second electric power supply path being assigned to the second half-circuit so that each half-circuit can be tested by a differential power analysis (DPA) independently of the other half-circuit, the two power supply paths being capable of being short-circuited.

BRIEF DESCRIPTION OF THE DRAWINGS

Other features and advantages of the invention will appear with the aid of the following description made with reference to the appended drawings which represent.

DETAILED DESCRIPTION

Figure 1:
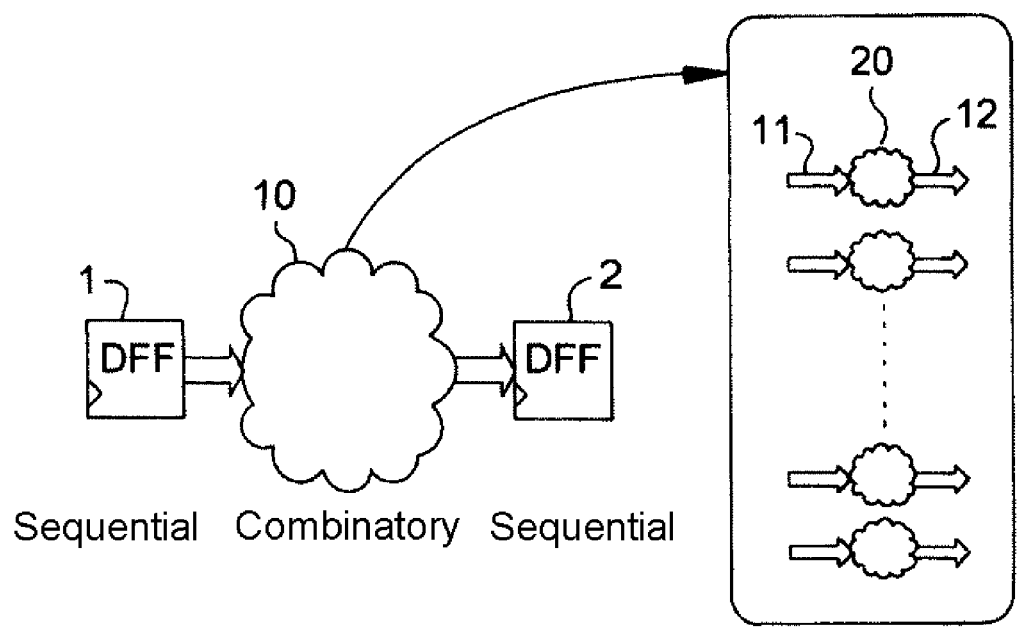
FIG. 1, an illustration of a combinatory data path of a cryptography algorithm inside a circuit.

FIG. 1 illustrates the combinatory data path of a cryptography algorithm inside a circuit, between two flip-flops DFF 1, 2 of a register. A combinatory logic 10 connects the two flip-flops DFF 1, 2. All the flip-flops of the circuit are therefore connected. The path splits into logic cones 20 of a reasonable size, for example less than 8 bits notably as in the DES (Data Encryption Standard) cryptography standard. FIG. 1 illustrates the DES situation in which the cones 20 have input slices 11 comprising 6 bits and output slices 12 comprising 4 bits.

This combinatory logic 10, connecting the registers 1, 2, is made from logic gates.

The invention uses differential power analysis to test the correct operation of the cryptography integrated circuits, usually used to hack into the cryptography circuits or to characterize their security level.

Differential power analysis, or DPA, makes it possible to correlate a measurement of a physical quantity emitted by a circuit, such as its instantaneous electrical consumption for example, with a portion of its activity. The DPA technique is usually used to hack into cryptography circuits, as described in the article by P. Kocher, J. Jaffe and B. Jun ("Differential Power Analysis: Leaking Secrets" in Proceedings of CRYPTO'99, volume 1666 of LNCS, pages 388-397, Springer-Verlag, or to assess their security level. It has notably been demonstrated, both theoretically and experimentally, that DPA can be used to predict the activity of a Boolean variable in a circuit, as shown notably in the article by S. Guilley, Ph. Hoogvorst, R. Pacalet and J. Schmidt "Improving Side-Channel Attacks by Exploiting Substitution Boxes Properties" in BFCA—http://www.liafa.jussieu.fr/bfca/, pages 1-25, 2007, May 2-4, Paris. In 0.13 μm CMOS technology, the number of measurements, called consumption traces, necessary to carry out the DPA analysis of a wired unit such as an ASIC for example, that is not protected, running a DES encryption algorithm is less than a thousand. This number is shown in the table below which gives details of the minimum number of traces to be analyzed to find 6 key bits. For each round, the DES algorithm uses 8×6=48 key bits entering a substitution box called "sbox".

Supérieure (ENS), France, November 2005, http://www.di-.ens.fr/-piret/publ/power.pdf. Experimental results are indicated in the second line of the table above.

As indicated previously, the invention uses DPA to test the cryptography circuits. The latter handle sensitive data, for example secrets such as keys or germs notably.

There are two types of cryptography circuits, unsecured circuits and secure circuits. The latter comprise countermeasures to protect themselves from hacking into their implementations, these countermeasures being designed to reject possible hackers. The invention applies to unsecured circuits and to secure circuits.

The test of an unsecured cryptography circuit is run by a DPA on all the nodes of the circuit, more particularly at each node of the registers. A cryptography circuit may comprise several thousands of nodes. There are essentially two types of nodes:
output equipotentials of memories or registers;
output equipotentials of logic gates.

It is possible to run a DPA only on the registers in order to deduce the state of the combinatory nodes and therefore find the secret.

Controllability is ensured by the cryptographic nature of the algorithm. Specifically, when the circuit is fabricated correctly, the essence of the calculation means that each node of the circuit has an activity rate close to %. The DPA consists in differentiating between the traces in which there is an activity for the node (according to a predictor or a selection function) and those in which there are no activities. This difference is zero for any node because there is no link between the predictor and this node, and non-zero for the tested node. A node is therefore considered to be operating correctly when the noted activity is correlated with the predicted activity. Observability can be carried out register by register by using an appropriate selection function. Such a function is notably described in the article by S. Guilley et al mentioned above. The coverage of the test is 100% because the total activity of all the gates is added together in the power-consumption traces. The number of test vectors is only a few hundred as shown in the table above. Moreover, relative to the IDDQ test notably, in which the measurements of the test must be concomitant, which slows down the process, the test by DPA can be divided into two tasks. The acquisition, the "on line" portion, which requires only a few hundred measurements, can be followed by the analysis, the "off line" portion, which can be carried out

|  | Sbox # | | | | | | | | Traces |
| --- | --- | --- | --- | --- | --- | --- | --- | --- | --- |
| Analysis | S1 | S2 | S3 | S4 | S5 | S6 | S7 | S8 | necessary = Max |
| DPA (plaintext random) | 228 | 615 | 736 | 510 | 297 | 55 | 272 | 111 | 736 |
| DPA (plaintext chosen) | 5 | 31 | 56 | 16 | 17 | 22 | 4 | 4 | 56 |

It should be noted that the same thousand power-consumption traces are used to find the eight words of 6 key bits. It is for this reason that the table summarizes the number of traces necessary by the maximum of traces per "sbox" and not their total. When the key is known, the analysis can be accelerated by choosing a known input of the algorithm, called "plaintext". One way of proceeding is described in the article by G. Perret "A note on the Plaintext Choice in Power Analysis Attacks" Technical Report from the Ecole Normale subsequently. The latter step, which may require a lot of computing power, is therefore not on the critical path.

Figure 2:
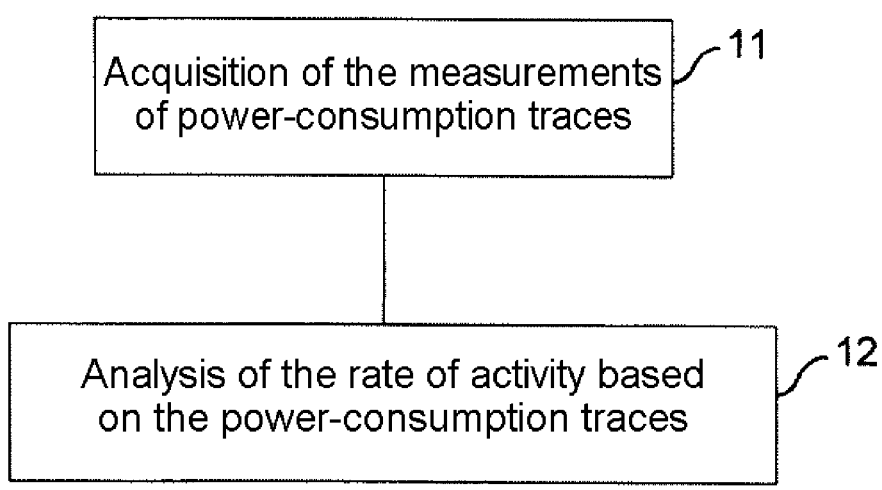
FIG. 2, a presentation of the phases of a differential power analysis used by the method according to the invention.

FIG. 2 therefore illustrates the two phases of a differential power analysis DPA applied for tests according to the invention.

A first phase 11 carries out the acquisition of the measurements of power-consumption traces from a set of input test signal vectors of the circuit to be tested. The test vectors used can be those used for a conventional DPA analysis.

A second phase 12 analyzes the rate of activity based on the measurements taken in the acquisition step.

Bit-by-bit extraction is achievable, because, in the cryptography circuits, the data paths, often wide, are in practice divided into logic cones of more restricted size. For example, in DES encryption, the data path is 64 bits wide and is divided into slices of 6 bits as illustrated by FIG. 1.

As indicated above, the secure circuits comprise countermeasures to prevent hacking, and notably hacking of the DPA type described above. Consequently, the test method explained above is not applicable, because in this case the ability to test implies the ability to hack by DPA. For the test of secure circuits, it is therefore not possible to test the intermediate values via a direct power analysis as for unsecured circuits.

Protection of secure circuits usually uses logics of the DPL (Dual rail with Precharge Logic) type. Two types are known:
constant power-consumption logic, such as WDDL (Wave Dynamic Differential Logic) and;
constant power-consumption logic on average, such as MDLP (Masked DLP)

In these two cases, these logics can be implemented with standard cells marketed by the fabricators in a design kit. More precisely, the gates processing complementary signals can be separated into two halves, or two networks, of complementary logic structures, forming a double rail gate of elementary gates, each elementary gate being associated with a dual gate. A first half which can be called "true" conveys the chain of payload signals, the other half, which can be called "false", conveys the complementary signals. These double rail gates, conveying complementary logic signals, prevent the power-consumption analyses carried out by DPA. Specifically, the electric activity, in terms of consumption, is constant and independent of the logic data since, when a gate switches to a logic state, the dual gate remains in the same state and vice versa. Any attempt at correlation by DPA analysis is therefore doomed to failure.

Figure 3:
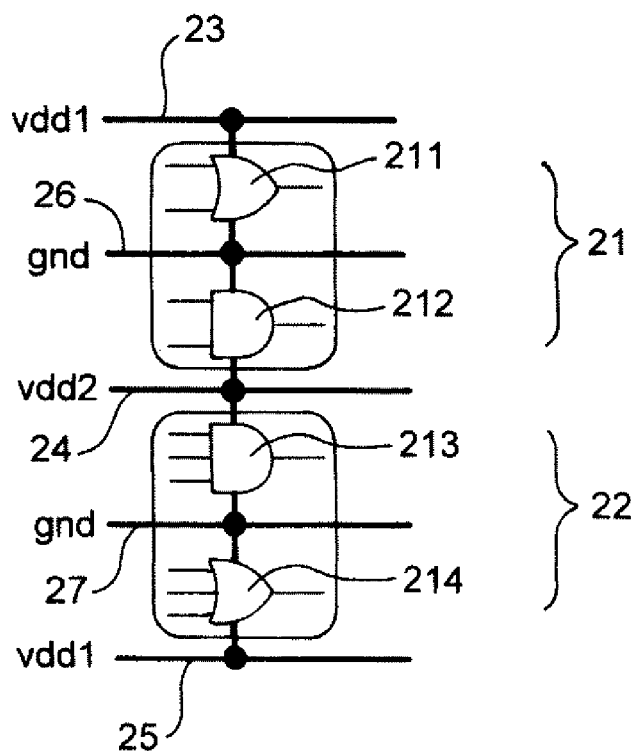
FIG. 3, an illustration of a structure of a secure cryptography circuit.

FIG. 3 illustrates such a structure of secure cryptography circuits. This figure shows, as an example, two double rail gates 21, 22 that can be separated into two halves conveying complementary signals. The first double rail gate 21 is an "OR" gate (211, 212). The elementary "OR" gate 211 of the first half receives the noncomplementary signals, while the dual "AND" gate 212 of the second half receives the complementary signals. For each elementary logic gate, when a node switches, the corresponding node of its dual gate 212 does not switch, the two halves thus masking one another.

In parallel with this first double rail gate 21, a second double rail "AND" gate 22 (213, 214) is shown operating likewise in complementarity.

The electric voltages are supplied to these logic gates 211, 212, 213, 214 by power supply lines 23, 24, 25. The gates are moreover connected to ground lines 26, 27 conveying the zero reference potential for the power supplies. The ground lines 26, 27 are connected together to a reference potential, which may be the ground potential. The power supply lines 23, 24, 25, having for example a voltage level of 1.2 volts in 130 nm technology, are connected together to an electric power supply.

The mutual masking of the operation of the two halves of a double rail prevents a DPA analysis and therefore also an operating test as described above.

In a circuit according to the invention, the power supply lines of a double rail 21, 22 are separated during fabrication. That is to say that the power supply line 23 powering the first half of a double rail 21, represented by the "OR" gate 211 is physically separated from the power supply line 24 powering the second half, represented by the "AND" gate 212. Therefore, the first power supply line 23 is connected to a first voltage source Vdd1 and the second power supply line Vdd2 is connected to a second voltage source Vdd2 distinct from the foregoing. The same applies to the power supply lines 24, 25 of the other double rail gates 22.

To make the cryptography circuit testable by DPA, the invention therefore proposes to power the two halves 211, 212 by different power supply voltage sources Vdd1, Vdd2, each moreover delivering a voltage level necessary for the operation of the gates. Therefore, in test mode, the two power supplies Vdd1 and Vdd2 are separated, which makes it possible to carry out a DPA on the two halves in parallel. The two halves receive signals which can be intertwined because the inversions are carried out by wires crossing between the half receiving the complementary inputs and that receiving the noncomplementary inputs.

Figure 4:
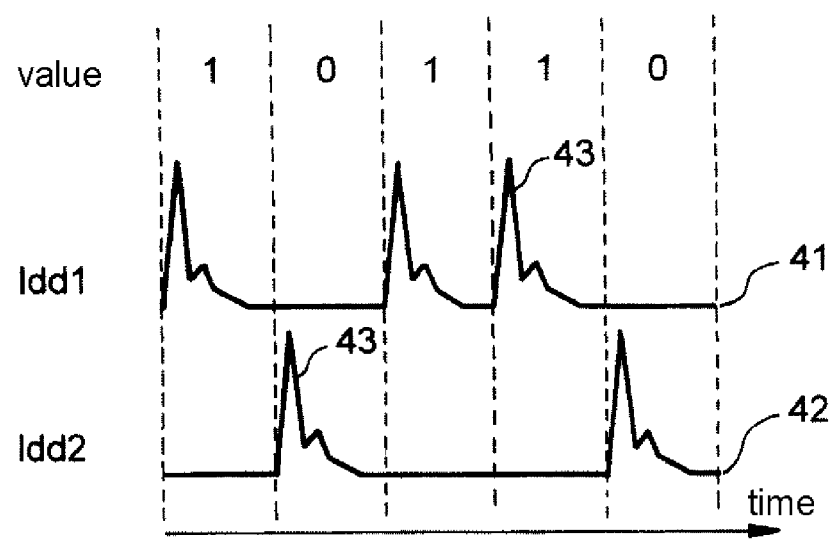
FIG. 4, an example of power-consumption traces acquired on the two halves of a secure circuit furnished with two separate power supplies.

FIG. 4 illustrates, by two curves 41, 42, the timing charts of the currents Idd1 and Idd2 originating respectively from the power supply voltages Vdd1 and Vdd2 for various values of a double rail signal corresponding to the two output nodes of the two halves. When the logic value switches to 1, a current peak 43 is consumed.

The 2 nodes composing the double rail signal can therefore be tested separately by the simultaneous acquisition of two power-consumption traces. When the 2 power supply voltages are connected together, the current becomes the total Idd1+Idd2 which always has the same shape, irrespective of the value of the node.

In an integrated circuit as illustrated partially by FIG. 3, the logic gates 211, 212, 213, 214 and their associated connection nodes, the power supply lines and the ground lines form rails, each gate of a rail being connected between a power supply line and a ground line. The duality of the gates, notably in order to protect against hacking by DPA, creates a second rail joined to the main rail, forming a double rail 21 as described above and illustrated by FIG. 3. One rail forms the "true" half and the other rail forms the "false" half.

The double rails are for example placed in parallel. FIG. 3 therefore shows a second double rail 22 parallel to the previous one 21. In this case, in order to separate the connections to the voltage sources Vdd1 and Vdd2 as described above, one power supply line 23, 25 out of two is for example connected to the first source Vdd1 and the other lines, fitted in between, are for example connected to the second voltage source Vdd2.

One half-circuit as mentioned above consists of the set of "true" rails and the other half-circuit consists of the set of "false" rails, powered respectively by Vdd1 and Vdd2. These half-circuits can be entangled as illustrated in the exemplary embodiment of FIG. 3, but they may also not be.

It should be noted that it is also possible to envisage separating the ground lines 26, 27. In this case, one ground line out of two would be connected to a first reference potential Gnd1 and the other ground lines, fitted in between, would be connected to a second reference potential Gnd2.

Figure 5:
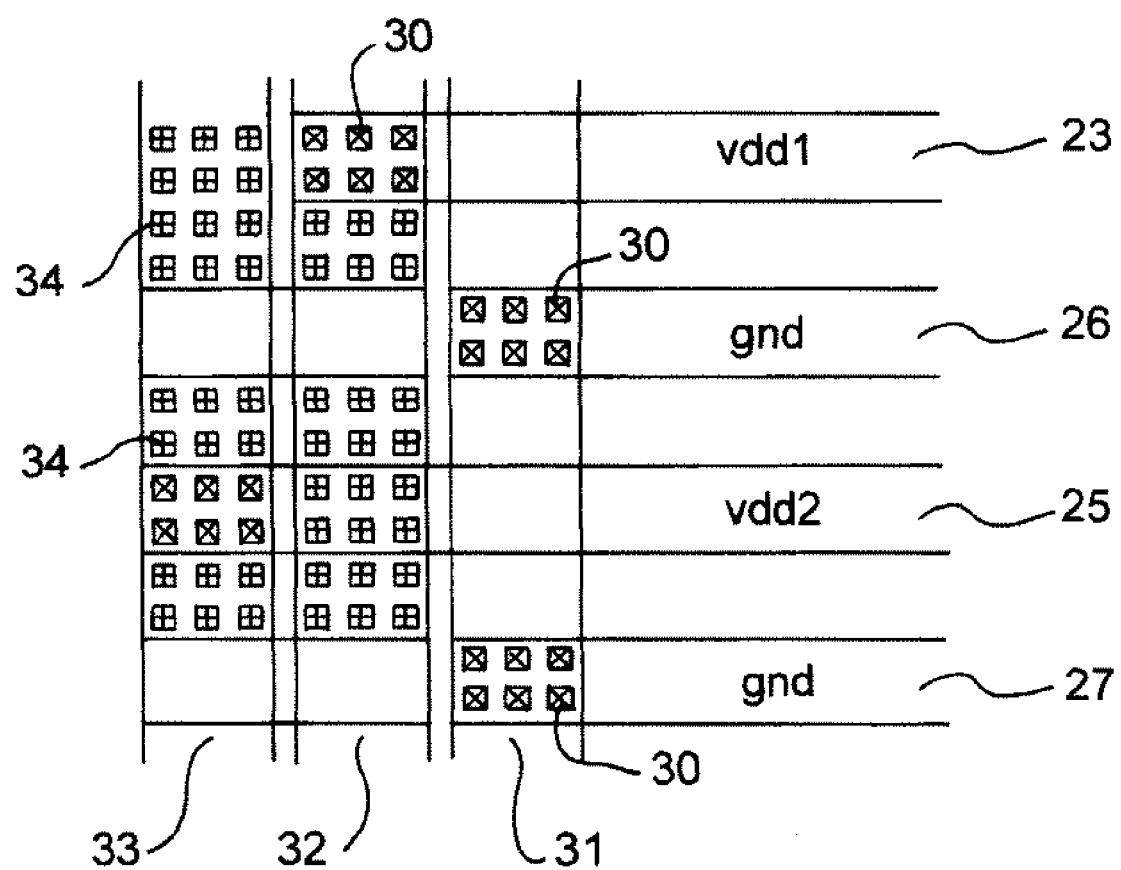
FIG. 5, an exemplary embodiment of a circuit according to the invention and of a method for short circuiting the power supply paths previously separated in a circuit according to the invention.

FIG. 5 illustrates an exemplary embodiment of a secure circuit according to the invention. It also shows a possible method for short-circuiting the power supplies Vdd1 and Vdd2 after the test phase. Accordingly, the figure shows only the power supply lines or ground lines, the assembly being produced in an integrated circuit, for example made of silicon.

After the tests, the power supplies Vdd1 and Vdd2 need to be short-circuited in order to secure the cryptography circuit, and notably to render it invulnerable to the malicious analyses by DPA. The gates of the first half-circuit and the dual gates of the second half-circuit are therefore powered by one and the same voltage source, according to the operation of a secure circuit.

FIG. 5 illustrates the situation in which it is the power supplies Vdd1 and Vdd2 that are separated, the ground lines 26, 27 all being connected to one and the same ground or reference potential. The figure shows the power supply lines 23, 25 and ground lines 26, 27 produced by tracks. The ground lines 26, 27 are for example connected to a first equipotential ring 31. This first ring, placed for example on the periphery of the circuit, is itself connected to a ground or reference potential. The connections of the ground lines to this ring 31 are illustrated by contact points 30. The power supply lines 23, 25 are connected to a double ring 32, 33, itself also situated, for example, on the periphery of the circuit. A first ring 32 electrically connected to the power supply lines 23 of the first half-circuit forms a first power supply path capable of being connected to a first power supply source. A second ring 33 electrically connected to the power supply lines 25 of the second half-circuit forms a second power supply path capable of being connected to a second power supply source. The first ring 32 is therefore for example connected to the voltage source Vdd1 and the second ring 33 is connected to the voltage source Vdd2, the connection being provided by contact points 30. One power supply line 23 is connected via the first ring 32 to the power supply Vdd1 and the next power supply line 25 is connected via the second ring to the power supply Vdd2. In general, the even power supply lines are for example connected to Vdd1 via the first ring 32 and the odd power supply lines are for example connected to Vdd2 via the second ring 33.

The two rings 32, 33 of the double power supply ring are connected together by antifuses 34. The latter are controlled in order to short-circuit the two rings 32, 33 after the test phase and therefore connect the power supply paths of the two half-circuits. The short circuit between the two power supply paths can therefore be produced in the silicon by antifuses as illustrated by FIG. 5 or in the package of the integrated circuit by an appropriate routing. Many solutions are known for sealing a circuit in a determined state.

The power supply lines, including the rings 31, 32, 33, are for example routed in the top layers of the circuit. The antifuses must be large enough to conduct all of the current necessary for the correct operation of the circuit. FIG. 5 shows a distribution of small antifuses 34; it is also possible to provide a single antifuse provided that it can transfer the same quantity of current. Certain technologies make it possible to obtain contacts of approximately 500 ohms for an antifuse 34 after it has been burned. There are other technologies in which the contact after burning can be of the order of 80 ohms. As a comparison, the resistance of the on-state contact points 30 is of the order of 1 ohm. Therefore a good connection between the power supply rings 32, 33 requires many more antifuses 34 than contact points 30. The connections can be made underneath as illustrated by FIG. 4 or on top, and even on both faces at the same time.

A secure cryptography circuit according to the invention comprises for example an additional power supply ring. The increase in width then corresponds to the addition of this ring, namely approximately 10 μm, around a cryptography unit that is approximately 1 mm wide. The increase to be provided is therefore only of the order of 1%.

The integration of the separation of the power supplies of the even lines, at Vdd1, and odd lines, at Vdd2, into an existing circuit design stream is trivial. Specifically, instead of generating two rings, three are produced. This operation is typically carried out in professional CAD tools in a single line of code.

In another embodiment, the ground lines 26, 27 can also be separated. Therefore a first power supply path then comprises a first peripheral conducting ring capable of being connected to a first ground potential Gnd1, electrically connected to the ground lines 26 of the components 211, 214 of the first half-circuit, and a second power supply path comprises a second peripheral conducting ring capable of being connected to a second ground potential Gnd2, electrically connected to the ground lines 27 of the components 212, 213 of the second half-circuit. As in the previous case, the two rings are capable of being short-circuited.

The test method according to the invention is easy to apply. The power-consumption trace measurements on the circuits when leaving fabrication for the DPA analysis simply require a standard apparatus, for example:
 a computer, for driving the circuit under test, fitted with;
 an acquisition card with great bandwidth, typically a few gigahertz.

Advantageously, the invention can be used by fabricators of secure cryptography circuits, notably the fabricators:
 of smart cards in particular for TPM applications, SIMs, electronic passports, labels, RFIDs, authentication tokens;
 on-chip systems for telecommunication applications.

The invention claimed is:

1. A method for testing correct operation of a cryptography circuit having a secret and including registers and logic gates interconnected by a set of nodes, said method comprising:
 performing a differential power analysis to predict activity of each node in the set of nodes;
 acquiring measurements of power-consumption traces at each node in the set of nodes as a function of test signal vectors at an input of the cryptography circuit;
 determining a rate of activity of each node in the set of nodes based on the measurements of the power-consumption traces at the set of nodes; and
 determining that a node in the set of nodes is operating correctly when the determined activity of the node is positively correlated with the predicted activity of the node.

2. The method as claimed in claim 1, wherein the differential power analysis is carried out with a known secret, and the secret of the cryptography circuit is customized after the test.

3. The method as claimed in claim 1, wherein, the cryptography circuit is secure and comprises a first half-circuit associated with a second half-circuit operating in complementary logic, wherein an electric power supply of the first half-circuit is separated from an electric power supply of the second half-circuit, the differential power analysis being carried out in parallel on each half-circuit, the two electronic power supplies being combined into one and same electric power supply after the test.

4. The method as claimed in claim 3, wherein components of the first half-circuit are connected via power supply lines to a first voltage source and components of the second half-circuit are powered via power supply lines to a second voltage source, the two voltage sources being distinct, and the power supply lines being connected after the test.

5. The method as claimed in claim 4, wherein the components of the first half-circuit are connected via ground lines to a first reference potential and the components of the second half-circuit are powered via ground lines to a second reference potential, the two reference potentials being separated, and the ground lines being connected after the test.

6. The method as claimed in claim 3, wherein the two electronic power supplies are combined after the acquiring step.

7. The method as claimed in claim 1, wherein the acquisition of the measurements of the power-consumption traces is carried out only on the registers.

8. A secure cryptography circuit comprising:
a first half-circuit;
a second half-circuit operating in complementary logic with the first half-circuit;
a first electric power supply path assigned to the first half-circuit; and
a second electric power supply path assigned to the second half-circuit, wherein:
the second electric power supply path is different from the first electric power supply path,
the first half-circuit and the second half-circuit are tested by a differential power analysis independently and in parallel, and
the first electric power supply path and the second electric supply path are configured to be short-circuited after testing of the first half-circuit and the second half-circuit.

9. The circuit as claimed in claim 8, wherein:
the first electric power supply path comprises a first peripheral conducting ring configured to be connected to a first voltage source and electrically connected to power supply lines of components of the first half-circuit;
the second electric power supply path comprises a second peripheral conducting ring configured to be connected to a second voltage source and electrically connected to power supply lines of components of the second half-circuit; and
the two peripheral conducting rings are configured to be short-circuited.

10. The circuit as claimed in claim 9, wherein the peripheral conducting rings are connected together by antifuses, the short circuit between the two peripheral conducting rings being produced by melting of the antifuses.

11. The circuit as claimed in claim 8, wherein:
the first electric power supply path comprises a first peripheral conducting ring configured to be connected to a first ground potential and electrically connected to ground lines of components of the first half-circuit;
the second electric power supply path comprises a second peripheral conducting ring configured to be connected to a second ground potential and electrically connected to ground lines of components of the second half-circuit; and
the two peripheral conducting rings are configured to be short-circuited.

12. The circuit as claimed in claim 8, wherein the electric power supply paths are connected together by antifuse technology allowing transition from an isolating state to a conducting state in an irreversible manner after melting.

13. The circuit as claimed in claim 8, wherein the secure cryptography circuit comprises only two electric supply paths.

14. A method of wiring power supplies of a secure cryptography circuit including a first half-circuit associated with a second half-circuit operating in complementary logic, the method comprising:
assigning a first electric power supply path to the first half-circuit; and
assigning a second electric power supply path to the second half-circuit, wherein:
the second electric power supply path is different from the first electric power supply path,
the first half-circuit and the second half-circuit are tested by a differential power analysis independently and in parallel, and
the first electric power supply path and the second electric supply path are configured to be short-circuited after testing of the first half-circuit and the second half-circuit.

15. The method as claimed in claim 14, wherein the secure cryptography circuit comprises only two electric supply paths.

* * * * *